G. A. LUTZ.
CONDUIT OR CONDUCTOR.
APPLICATION FILED JAN. 25, 1915.
1,275,279.
Patented Aug. 13, 1918.
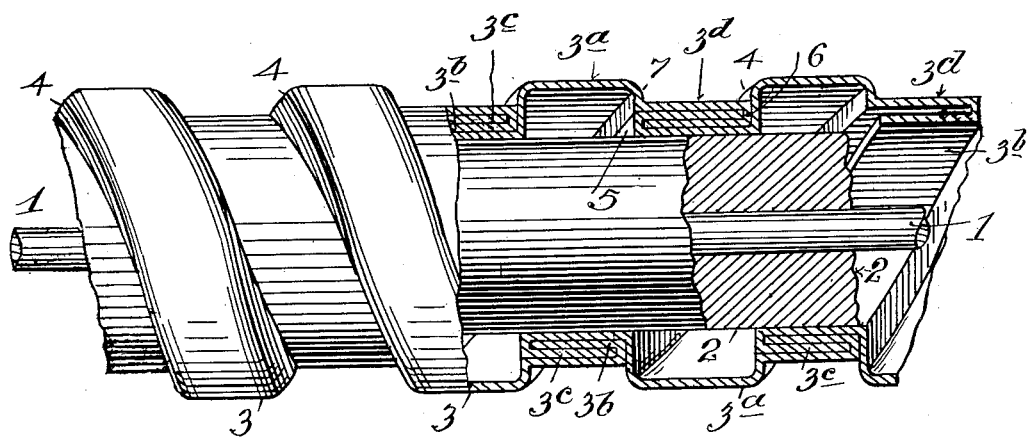
Fig. 1.
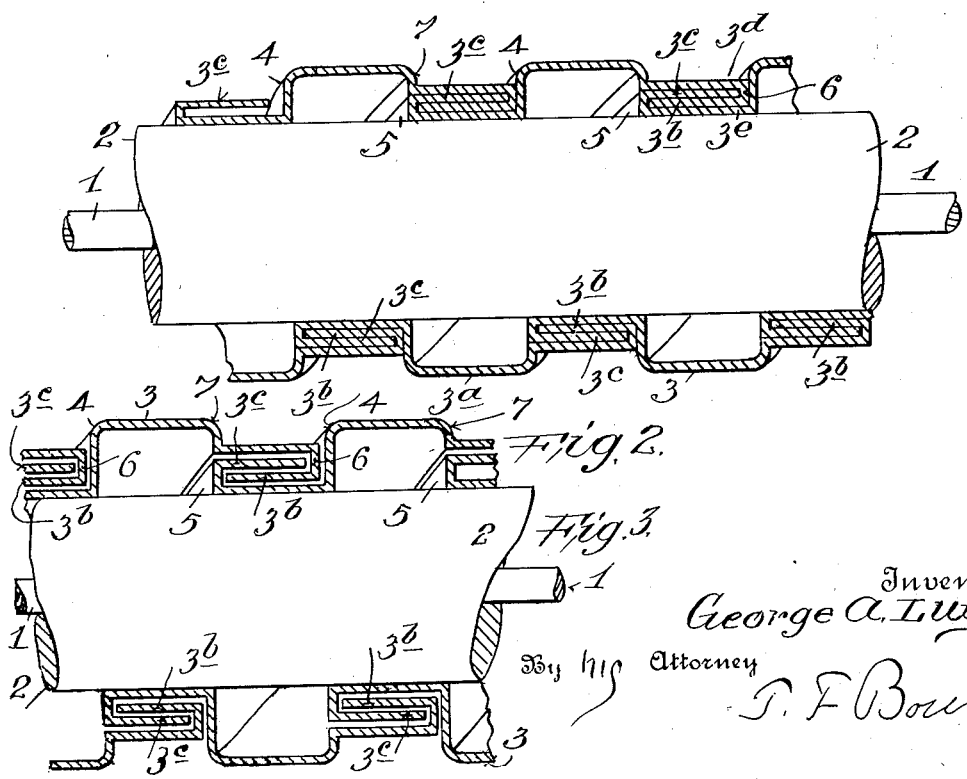
Fig. 2.
Fig. 3.
Inventor
George A. Lutz
By his Attorney
T. F. Bourne

UNITED STATES PATENT OFFICE.

GEORGE A. LUTZ, OF CRANFORD, NEW JERSEY, ASSIGNOR TO AMERICAN CIRCULAR LOOM COMPANY, OF PITTSBURGH, PENNSYLVANIA, A CORPORATION OF PENNSYLVANIA.

CONDUIT OR CONDUCTOR.

1,275,279.　　　　　Specification of Letters Patent.　　Patented Aug. 13, 1918.

Application filed January 25, 1915. Serial No. 4,089.

*To all whom it may concern:*

Be it known that I, GEORGE A. LUTZ, a citizen of the United States, and resident of Cranford, in the county of Union and State of New Jersey, have invented certain new and useful Improvements in Conduits or Conductors, of which the following is a specification.

An insulated conductor or cable having a flat spirally wound metallic covering that is sufficiently thin to enable the conductor or cable and covering to be readily bent is more or less objectionable or faulty, since when the same is bent at a rather sharp curve the inner or concave portion of the bend is liable to kink and press into or injure the insulation while the outer or convex portion of the covering at such curve stretches or slides at the joints, whereby the insulation is liable to be exposed.

The object of my invention is to provide an insulated conductor or cable with a metallic covering substantially in the form of a spiral-like winding having the marginal edges of the winding secured together against longitudinal displacement, while the portion of the winding between such secured marginal edges projects or is raised from the interior insulation, and when the conductor or cable is to be bent the projecting portion of the winding, at the inner or convex portion of the curve so formed, may be displaced or be squeezed laterally or inwardly to accommodate the curve without injuring the insulation, and the projecting or raised outer portion of the winding at the outer or convex curve may stretch or elongate as may be required to accommodate the spiral winding at such curve.

Such construction is particularly applicable for use as metallic coverings for insulated conductors or cables where the metallic outer winding is to be used as a ground return, and where, for the sake of cheapness, the protecting winding is to be made of relatively thin metal, my improvements in such relation being of further advantage, since, with the marginal edges of the spiral winding secured from displacement in a longitudinal direction, such covered or protected conductor or cable may be pulled through walls, between floors, and in like places, without danger of displacing the spirals or windings with respect to one another, serving also to strengthen the device for suspension thereof.

Reference is to be had to the accompanying drawings forming part hereof, wherein, Figure 1 is a partly sectional side elevation of an electric conductor or cable embodying my invention, and Fig. 2 is a longitudinal sectional view, and Fig. 3 is a sectional view illustrating assemblage of the parts in the position they may assume just before the marginal folds of the spiral winding are pressed together in the condition illustrated in Fig. 1.

The insulated conductor or cable, comprising one or more conductors 1 and inclosing insulation 2, may be of any well known construction, and around the same is a spiral metallic winding or strip indicated generally at 3. The central portion of the spiral winding or cover 3 projects or is raised from the insulation, as indicated at $3^a$, and the marginal portions of such winding at $3^b$, $3^c$ are bent back reversely in such direction as to substantially face each other, such marginal portions $3^b$, $3^c$ of adjacent windings or spirals being interlocked. In other words, the space between the outer web $3^d$ and its inturned marginal portion $3^b$ of one side of the winding receives the inturned marginal portion $3^c$ of the other side of the winding, the space between such marginal portion $3^c$ and the base portion $3^e$ of such winding receiving the marginal portion $3^b$ of the adjacent winding, whereby the edge portions of the windings or spirals are interlocked. After such parts have been interlocked, they are preferably forced or squeezed together, whereby the edge portion of one winding opposes or abuts the outwardly extending portion 4 of the adjacent winding. Furthermore, as illustrated, the edge of the part $3^b$ of one winding opposes or abuts the lateral portion 5 of the adjacent winding, and the edge of the part $3^c$ opposes or abuts the lateral portion 6 of the adjacent winding, whereby the windings are retained in set positions, and extension of the covering 3 in a longitudinal direction along the insulation is limited or prevented, so that the winding cannot become separated. A substantially water-tight protecting cover for the insulated conductor or cable is produced by the arrangement set forth.

With my improvements, when the conductor or cable is to be bent, as to be carried around a corner, the marginal portions of the spiral winding being retained in relative relation as stated, maintain their protecting effect upon the insulation and yet the inner projecting or extending portion 3ᵃ of the covering may bend or crowd inwardly, as required to accommodate the inner or concave portion of the curve, without endangering the insulation, while the outer protecting portion 3ᵃ of the covering may expand, or its sides or walls 4 or 7, or both, may be displaced, to accommodate the requirements of the outer or convex portion of such curve, by reason of the pull or strain upon the interlocked marginal portions of the winding. The thickness of the layers at the interlocked marginal portions of the windings, and the spacing of the portion 3ᵃ from the insulation, provides a further advantage of resistance to tacks or nails being driven into the insulation. Furthermore, since the margins of the spirals are interlocked the windings of the covering 3 are retained from separation when the conductor or cable is pulled or pushed as through or between walls, floors and the like, or when the conductor or cable is suspended from an overhead position.

It will be understood that the interlocking and squeezing together of the marginal portions of the winding 3 may be accomplished by suitable tools or rolls as the winding is being laid upon the insulation. Also, that my improved winding may be used in the nature of a conduit or tubing, whether formed directly upon an insulated conductor or cable or formed separately to receive the same, or for use as a conduit for fluids or other purposes.

Having now described my invention what I claim is:

1. The combination of an insulated conductor with a spiral winding thereon having its central portion projecting outwardly from the insulation and having interlocked marginal portions secured together and opposing and engaging one another in a lateral direction to prevent longitudinal displacement to permit bending without injuring the insulation.

2. The combination of an insulated conductor with a spiral winding thereon having its central portion projecting outwardly from the insulation and its side portions extended toward each other providing spaces, the extended portion of one side of the winding entering such space of the adjacent side portion of the winding, and being interlocked and secured together with the side portion of the winding opposing and engaging a lateral portion of the adjacent side portion to prevent longitudinal displacement to permit bending without injuring the insulation.

3. The combination of an insulated conductor with a spiral winding thereon having its central portion projecting outwardly from the insulation and its side portions extended toward each other providing spaces, the extended portion of one side of the winding entering such space of the adjacent side portion of the winding, the edge of one such extended side portion of the winding opposing and engaging the lateral portion of the adjacent side portion of the winding, the joints between windings being between the central projecting portions, whereby elongation of the winding is prevented and the winding may bend without injuring the insulation.

4. The combination of an insulated conductor with a spiral winding thereon having its central portion projecting outwardly from the insulation and its side portions extended toward each other providing spaces, the extended portion of one side of the winding entering such space of the adjacent side portion of the winding, the edge of one such extended side portion of the winding opposing and engaging the lateral portion of the adjacent side portion of the winding, the joints between windings being between the central projecting portions, the lateral portion of one winding opposing and engaging a lateral wall of an adjacent side portion of the winding to resist longitudinal movement of the winding and preventing injury to the insulation when the article is bent.

5. A tubing comprising a spirally wound strip having a centrally spirally disposed outwardly projecting portion and marginal interlocked parts at the sides of and between the central portions spacing the central portions of the windings apart, said interlocked side parts having opposing portions engaging in a lateral direction and secured together to prevent displacement in the longitudinal direction of the tubing.

6. A tube comprising a spirally wound strip having its central portion projected outwardly and its side portions extended toward each other providing spaces, the extended portion of one side of the winding entering such space of the adjacent side portion of the winding, the edge of one such extended side portion of the winding opposing and engaging the corresponding lateral side of said projecting central portion of the winding to prevent longitudinal displacement of the winding in either direction.

Signed at New York city, in the county of New York, and State of New York this 22nd day of January, A. D. 1915.

GEORGE A. LUTZ.

Witnesses:
T. F. BOURNE,
MARIE F. WAINRIGHT.